United States Patent
Anderson

(10) Patent No.: US 7,440,408 B1
(45) Date of Patent: Oct. 21, 2008

(54) METHOD AND SYSTEM FOR INVENTORYING A NETWORK

(75) Inventor: Woodrow Norvel Anderson, Wellsville, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 941 days.

(21) Appl. No.: 10/659,185

(22) Filed: Sep. 10, 2003

(51) Int. Cl.
*H04L 12/26* (2006.01)
*H04L 12/28* (2006.01)

(52) U.S. Cl. .................. 370/252; 370/254; 370/401

(58) Field of Classification Search ............. 370/252, 370/254, 248, 251, 401, 221, 222, 224
See application file for complete search history.

(56) References Cited

U.S. PATENT DOCUMENTS

| | | | |
|---|---|---|---|
| 6,718,384 B2 * | 4/2004 | Linzy | 709/224 |
| 6,934,290 B2 * | 8/2005 | Story | 370/395.1 |
| 7,050,404 B1 * | 5/2006 | Devlin | 370/254 |
| 7,139,823 B2 * | 11/2006 | Benfield et al. | 709/224 |
| 7,249,173 B2 * | 7/2007 | Nicolson | 709/223 |

* cited by examiner

*Primary Examiner*—Chau Nguyen
*Assistant Examiner*—Hicham B Foud

(57) ABSTRACT

A discovery tool that can take the form of a method, system, and/or medium for retrieving and storing information about devices of a communications network is provided. The discovery tool is protocol specific rather than device specific and includes a set of device-configuration files, a generic network-element interface, and a generic resolver. The generic resolver chooses a generic network-element interface based on a protocol compatible with a specific network device. The method includes determining a protocol-specific interface module to communicate with a network device, establishing a logical connection with the network device, determining which configuration file should be used to interrogate the device, and then using the configuration file to interrogate the device and thereby receive device-attribute data related to the device.

18 Claims, 8 Drawing Sheets

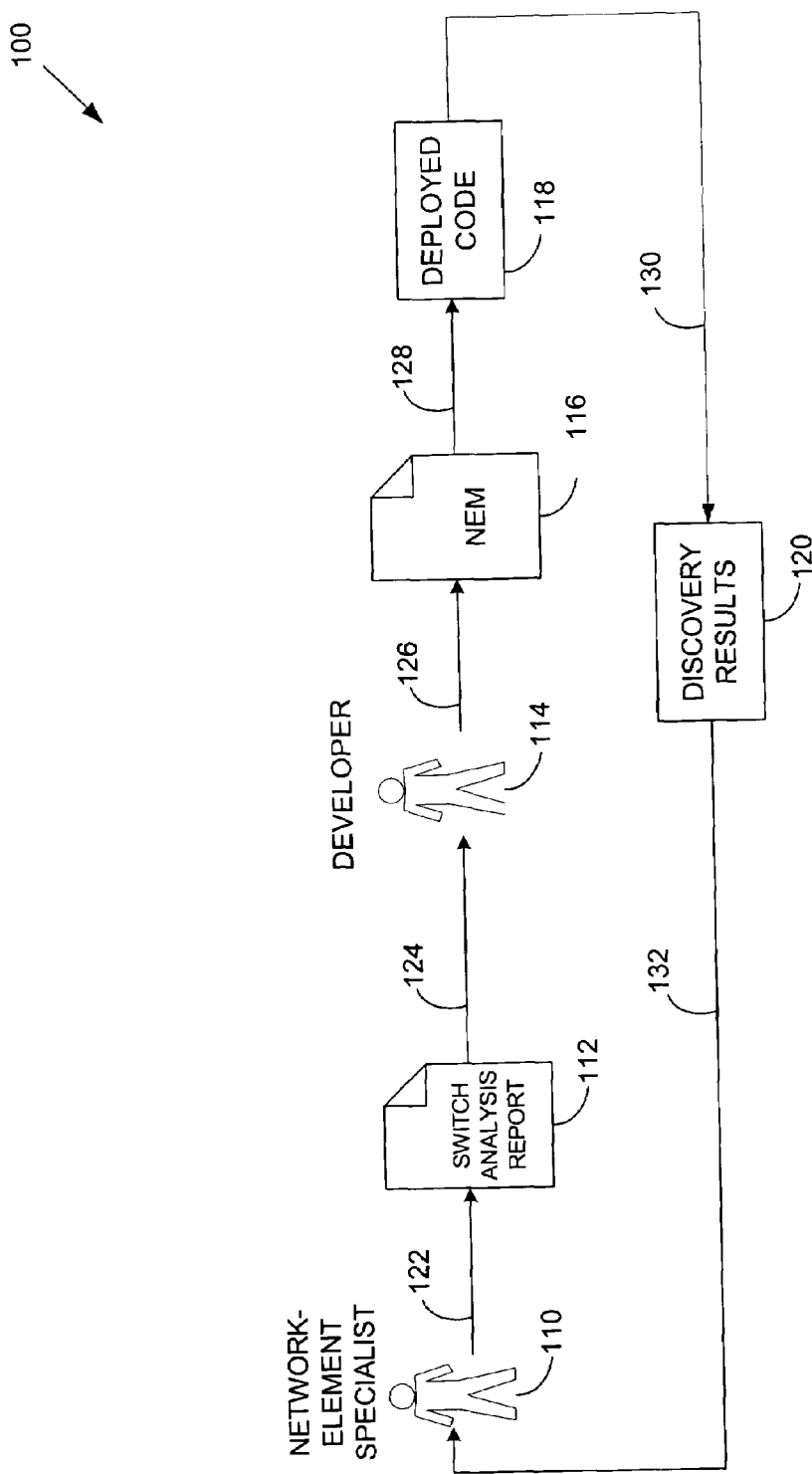
FIG. 1. - Prior Art

```
DISCOVERY PLAN FOR THE ALCATEL LITESPAN2000  V10
DISCOVERY_PLAN("TL1","ALCATEL","LITESPAN2000")
    // DISCOVER THE NETWORK ELEMENT
    // DISCOVER THE TERMINALS AS SHELVES
    // DISCOVER THE COMMON CONTROL AND CHANNEL BANK SHELVES
    // DISCOVER THE CARDS
    // DISCOVER THE OC3 FACILITIES ON COMMON CONTROL SHELVES
    // DISCOVER THE OC3 FACILITIES ON CHANNEL BANK SHELVES
    // DISCOVER THE STS1 CIRCUITS.  THESE WILL HOST ON OC3 CARDS.
    // DISCOVER THE T1 CIRCUITS.
    // DISCOVER THE ISDN DSL CHANNELS
    // DISCOVER THE T0 PORTS AND CHANNELS
    // DISCOVER THE ADSL PORTS
    // DISCOVER THE ETHERNET PORTS
    // DISCOVER THE SHDSL PORTS
    // DISCOVER THE VIRTUAL TRIBUTARIES
    // DISCOVER THE T0 PHYSICAL CROSS CONNECTIONS
    // DISCOVER THE T0 LOGICAL CROSS CONNECTIONS
    // DISCOVER THE T1 PHYSICAL CROSS CONNECTIONS
    // DISCOVER THE T1 LOGICAL CROSS CONNECTIONS
    // DISCOVER THE VIRTUAL CIRCUIT (VC) CROSS CONNECTIONS
    // DISCOVER THE VIRTUAL PATH (VP) CROSS CONNECTIONS
```

*FIG. 3.*

METHOD AND SYSTEM FOR INVENTORYING A NETWORK

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the fields of telecommunications, data networking, and computer programming. More particularly, it relates to communicating with devices of a network and retrieving attributes associated with those devices.

BACKGROUND OF THE INVENTION

Owning and maintaining a telecommunications or data network is a complex, challenging, and costly endeavor. Technology is constantly evolving at a rapid pace. As new features and device types are deployed, the tools used to manage networks must by continuously updated. This leads to escalating costs that must be carefully controlled in order to remain competitive. Another result of the rapid evolution of the network is that the tools must also be rapidly updated.

Accordingly, a burdensome task that plagues network owners is maintaining current and accurate records of the devices (elements) on the network. Exemplary networks include telecommunications networks and data networks. This problem is exacerbated as a network grows more complex. A mature network may span the globe. Keeping track of what devices are where, what equipment the devices contain, and what services are provisioned on them can be very difficult. This leads to underutilization of resources due to stranded assets that are not reflected in the network inventory, precipitating higher capitol and operational expenses.

One method employed to help mitigate this problem involves employing computer-automated network-discovery techniques. "Discovery" as used in the field of telecommunications and data networking is a term that refers to finding and identifying network components and their corresponding attributes. The information attained is used to audit and correct the network inventory, leading to a more efficient and cost-effective use of the network.

A discovery tool attempts to probe and gather data related to the devices on the network. But current discovery tools are not as efficiently deployed as they could be. For instance, one common approach has been to implement device-specific computer application code to communicate with a specific type of network element. A heterogeneous communications network is composed of elements from various vendors. Products from different vendors typically require different communications protocols. Moreover, communicating with various devices that are even made by the same manufacturer may require a very specific communications mechanism.

A prior-art component that has been used to communicate with network elements to retrieve device information is referred to as a NEM (Network Element Model), offered by the CoManage Corporation of Wexford, Pa. for use with their TrueSource™ software product (or developed by customers or system integrators who have acquired the TrueSource™ product). NEMs are used in connection with a discovery engine, which is a component of TrueSource™ that performs sweeps of a network to obtain configuration information. During these sweeps, a resolver framework maps device-specific NEMs to their respective network devices. Device-specific information is contained within such NEMs. Thus, a new NEM must be developed for every device type in the network that must be discovered.

NEM development can be divided into two major activities. First, a specific type of network device is analyzed. Based on business requirements for the given device type, an analyst must determine which components, attributes, and service elements need to be discovered. For those elements that support multiple communication protocols, the appropriate protocol must be selected. The queries or commands necessary to send to a device to perform discovery must be determined, along with the order in which those commands must be issued. The method of interpreting the response from the device, and how to translate and map the information returned into domain objects in the TrueSource™ data schema also must be specified by the analysis. The other major activity of prior-art NEM development is to implement the NEM code to perform session establishment, issue queries, parse the responses, perform translations and schema mappings, and to create and populate domain objects specified by the analysis. Session establishment and query generation can be aided by code wizards, but parsing, translations, and schema mappings require meticulous and specific code that must be hand-coded by a developer. Notable shortcomings of the prior-art include the need for multiple persons, manual-coding to produce a device-specific NEM, a compiling and deploying process, and a lengthy iterative review and correction process. Moreover, writing NEM code is typically tedious and prone to error.

Developing a separate NEM for every device type in the network is a time-intensive, resource-intensive, expensive, and inefficient method of providing components that perform discovery functions. Developing a NEM requires a device specialist who is familiar with the device to be communicated with, as well as a competent software developer skilled in the Java programming language. These roles may be performed by the same person, but finding someone having the necessary skills to perform both roles may be difficult. The device specialist determines what steps are required for performing discovery on a given device type, and the developer then writes code that performs those steps. The device specialist examines a specific device type and sets forth parameters for communicating with the devices. The device specialist must be intimately familiar with the given type of network device to be queried.

Network devices are often complex, and a fair amount of time can be expended learning how to communicate with a specific network device. The device specialist produces a document specifying the commands to issue to the given device, how to interpret the results received, and how to map and translate those results to the TrueSource™ data schema. The software developer then works within those parameters and, using the development framework/toolkit offered by CoManage for use with the TrueSource™ application, writes Java code that implements the functionality indicated by the device specialist's analysis.

After the coder develops the NEM, it must be tested. The test results must typically be examined by the device specialist, and, if errors are found, the analysis must be amended or corrected. The revised analysis must then be analyzed by the software developer who then updates the Java code to reflect the corrections to the analysis. This cycle usually continues for several iterations until no significant errors are detected during testing. Finally, the NEM is put into use. But again, it can only be used to interrogate a single, specific, device type. This process must be repeated for as many device types as there are on the network.

This prior-art solution is the approach used by Comanage, who offers the aforementioned TrueSource™ product and various NEMs for selected device types. This approach has put all device-specific knowledge in the NEMs (and resolvers), and has kept device-specific knowledge out of the rest of their system. This form of prior-art solution effectively confines device-specific code to the NEMs and is limited by at least two major factors. Because each NEM is developed for a specific type of network device, systems that contain many device types (which is common) require many NEMs to be developed and deployed. Encoding device-specific logic in the NEMs removes that design requirement the from rest of the prior-art system, but results in an inefficient development technique because so many NEMs have to be created. Another major factor is the inefficiencies arising from the length of the analyze/develop/test cycle required to develop a NEM. Because this cycle must usually be repeated many times, the amount of effort required for each cycle can have a dramatic negative effect on the cost of implementing the solution. An exemplary prior-art solution is represented in FIG. 1.

FIG. 1 includes a network-device specialist 110, a device-analysis report 112, a software developer 114, NEM source code 116, deployed code 118, and discovery results 120. At a step 122, specialist 110 analyzes a type of network device and produces an analysis report 112. The analysis report summarizes information specific to the given type of network device. The report is provided to developer 114 at a step 124. Developer 114 produces the NEM source code 116 at a step 126. The NEM code 116 is specific to the given type of network device. The code is compiled and deployed at a step 128 to produce deployed code 118, which will ultimately be used in the discovery system 100. Results 120 are returned for review to the analyst 110 at a step 132, where they are validated. If any errors or omissions are detected, the analysis report 112 is updated and again sent to the developer 114 for coding and testing. This cycle is repeated until the analysis is perfected and complete. The end result of these iterations will be a single NEM, a NEM specific to a single device type.

Dividing the analysis and implementation between two people makes maintaining a satisfactory level of productivity difficult. The device specialist 110 must wait for the developer 114 to finish implementing the code, compiling and deploying it, and running the tests to produce the results 120. The test results are then sent back to the analyst 110 for validation. The developer 114 must then wait for the analyst 110 to make changes to the analysis report 112 if changers are required. It is difficult to produce a complete and correct analysis on the first pass. It is also often helpful for the analyst to see a portion of the results before proceeding with further analysis. Because of these factors, repeating this cycle many times for each NEM developed is generally necessary.

The current state of the art could be improved by a discovery scheme that uses a network-element-discovery component that is device independent. There is a need for a discovery mechanism that is not constrained to individual device types but can be used across a broad range of network devices.

SUMMARY OF THE INVENTION

The present invention is a system and method that solves at least the above problems by providing a network-element-discovery system that can communicate with a variety of network devices in a protocol-specific manner rather than in a device-specific manner to interrogate network elements (identify network elements and log attributes related to those elements). There are far fewer protocols than network device types. This system eliminates the need for device-specific interfaces and allows network discovery to be performed much more efficiently. Moreover, the present invention eliminates the requirement to manually code device-specific NEMs, eliminates the compile process, and significantly streamlines the iterative review process of the prior art.

In one aspect, the present invention provides a device-agnostic framework where the details of discovery are contained in what is referred to herein as a discovery plan. Such a plan is like a recipe that describes how discovery is to be performed for a given network device type. It specifies which commands and queries must be issued to a device, how to parse and translate the results, and how to create and populate corresponding schema objects in a device-independent manner. All device-specific details are contained within such discovery plans, which are simple text files written in a specific format.

In another aspect, the present invention provides a generic network-element interface (GeNEI), which understands how to read a discovery plan and how to carry out the actions specified by such plan. A specialized GeNEI is written for each communication protocol used to communicate with network elements (for example, SNMP, TL1, Telnet, etc). A specific GeNEI written for a given protocol can perform discovery on any type of network device which communicates with that protocol and for which a discovery plan is provided.

In another aspect, the present invention provides a generic resolver component to map discovery plans to network devices. In a preferred embodiment, a resolver configuration file is provided for each protocol.

In still another aspect, the present invention provides a set of discovery plans. A discovery plan may be a rose known by many other names to those skilled in the art, but it includes any output of a device analysis embodied in an unambiguous, consistent, and documented format.

In a final aspect of the invention, a method is provided to gather device information from a communications network. The method includes providing a set of discovery plans, determining the appropriate GeNEI to use for performing discovery on a given network device, determining an appropriate—preferably the best—discovery plan for the GeNEI to use for performing discovery on a given device, retrieving data related to a variety of network devices, and automatically populating a database with the retrieved data.

The present invention improves the discovery process by simplifying the interface-development process, and removes the device-specific constraints associated with the prior-art. This design requires considerably fewer interfaces while significantly reducing the involvement of software developers by replacing the code-development process with the generation of discovery plans. Much less effort is required to support a given type of network device using this approach.

BRIEF DESCRIPTION OF THE SEVERAL VIEWS OF THE DRAWINGS

The present invention is described in detail below with reference to the attached drawing figures, wherein:

FIG. 1 is a block diagram depicting a prior-art method for developing a device-specific discovery interface;

FIG. 3 provides high-level pseudocode representative of merely one example of a discovery plan;

DETAILED DESCRIPTION OF THE INVENTION

Figure 2A:
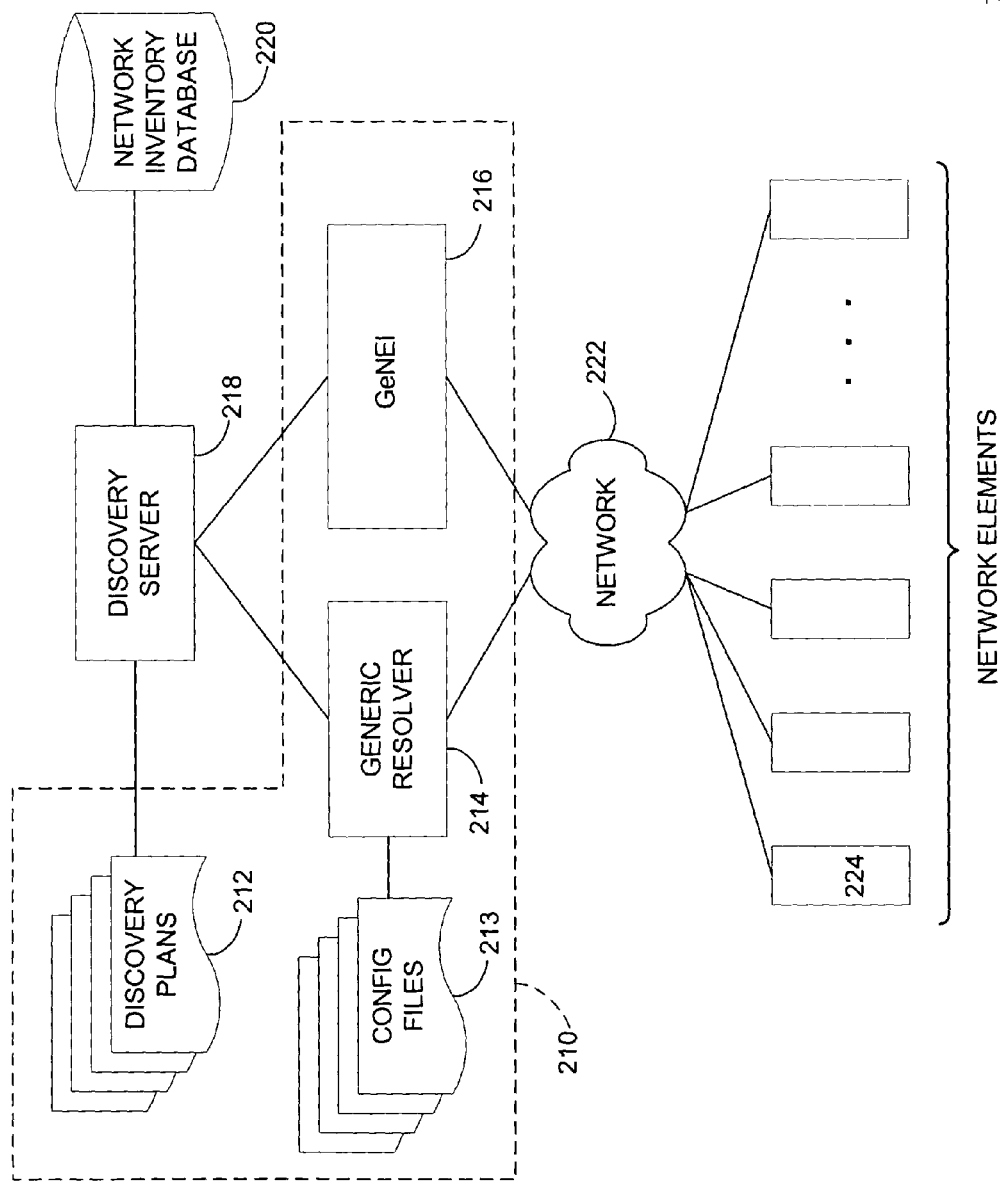
FIG. 2A is a block diagram depicting an illustrative operating environment suitable for practicing the present invention.

The present invention provides an improved method of interrogating a communications network and identifying what components are on the network. The present invention can be somewhat analogized to a physical, modular-general-purpose tool. Instead of developing a dedicated drill, a dedicated sander, a dedicated saw, and a dedicated buffering device, a modular tool may have a common—or universal—base that outputs a rotating shaft to receive various attachments. The shaft and housing form a base that is designed to receive multiple tool heads, such as a drill attachment, sanding attachment, sawing attachment, or buffer attachment. The generic network-element interface of the present invention is analogous to the universal base. The described discovery plans are analogous to the various attachment heads. The present invention enhances the prior art by offering a modularity-type aspect. The present invention is a discovery system whereby a generic interface can be used across various vendors and devices. The generic interfaces use specific discovery plans to discover an array of network elements.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

ADSL Asymmetric Digital Subscriber Line
ASCII American Standard Code for Information Interchange
ATM Asynchronous Transfer Mode
CORBA Common Object Request Broker Architecture
DSL Digital Subscriber Line
GeNEI Generic Network-Element Interface
IDE Integrated Development Environment
IP Internet Protocol
ISDN Integrated Services Digital Network
NEM Network Element Module
OID Object IDentifier
PBX Private Branch eXchange
POTS Plain Old Telephone Service
SNMP Simple Network Management Protocol
SONET Synchronous Optical Network
SSH Secure SHell
TDM Time-Division Multiplexing
TL1 Translation Language 1
TSSDK TrueSource™ Software Development Kit Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are the means of communicating with the same. By way of example, and not limitation, computer-readable media include data-storage media and communications media.

Data-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, Digital Versatile Discs (DVD), holographic media or other optical storage devices, magnetic cassettes, magnetic tape, magnetic disk storage, and other magnetic storage devices. These memory components can store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As previously mentioned, the present invention is a system that improves the networks management by helping to ensure the accuracy of network-inventory records. The present invention is described with respect to a preferred embodiment. In the preferred embodiment, the present invention employees a network-element discovery component such as a Generic Network-Element Interface (GeNEI). The GeNEI uses a discovery plan to populate a network-inventory database, which can be used to synchronize or reconcile other inventory databases. In a preferred embodiment, A GeNEI is built using technology similar to the TrueSource™ SDK ("TSSDK"). The TSSDK is a toolkit containing code wizards and is built on top of JBuilder, a common Java IDE. The TSSDK not required for NEM development.

To facilitate a better understanding of the present invention, it will be described with reference to the TrueSource™ application. But the following explanation describes merely one embodiment. One skilled in the art would appreciate that the present invention could be employed in a variety of embodiments or be used in connection with a variety of discovery schemes.

Exemplary Operating Environment

FIG. 2A is a block diagram depicting an exemplary operating environment suitable for practicing the present invention. An improved discovery system 210 includes a set of discovery plans 212, generic resolver(s) 214, and GeNEI(s) 216. The discovery plans 212 are accessible by a discover server 218, which is coupled to a database 220 that stores network-inventory information. Network 222 provides access to possibly hundreds or thousands of network elements 224.

Figure 2B:
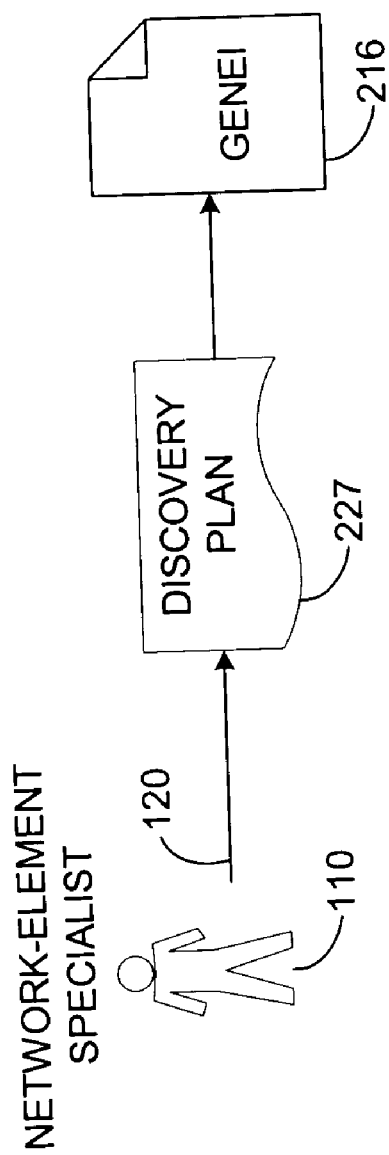
FIG. 2B is a block diagram depicting an exemplary method for developing a discovery plan to be used with a generic network-element interface.

An exemplary method for creating a discovery plan is provided in FIG. 2B. Network-element specialist 110 examines a specific type of network element 224 to create a specific discovery plan 227 (which will belong to discovery plan set 212) that will be used by GeNEI 216. The discovery plan is the primary output of the analysis phase, as opposed to the analysis report of the prior-art system. An analysis report may optionally be produced along with the discovery plan to document assumptions, business requirements, and other forms of documentation.

Discovery Plan

All device-specific knowledge is contained in a discovery plan, such as discovery plan 212, which can be an ASCII, text, or other type of file and can be written in a syntax that is much simpler than Java. Those skilled in the art will appreciate that a discovery plan can assume many forms, so long as it provides an unambiguous, consistent, and documentable format. This format enables GeNEI 216 to read the analysis and directly perform necessary actions without a developer having to tediously and repetitively write Java (or other) code.

A discovery plan specifies the steps necessary to perform discovery on a network element 224. For any element 224, discovery is performed by sending queries to the device, parsing the information returned, performing translations on the results, creating schema objects, and populating the attributes of the discovered objects with the results in a storage device such as database 220. These steps are similar for all elements. Details may differ as to which queries to submit, how to parse and translate the results, and/or how to map the results into a schema. Each discovery plan configured to facilitate network-device communication based on various factors. Exemplary factors include protocol, vendor, and/or device type. A discovery plan indicates details about how to retrieve general information about the element or device (i.e. how to retrieve hardware version, etc.); and how to retrieve specific information about the element or device (i.e., how to retrieve information regarding bays, shelves, etc.). These details are provided in the discovery plan.

Discovery plan 212 contains instructions that indicate the specific steps that need to be followed to perform discovery on a network device of a given type. For example, discovery plan 212 specifies which queries to submit, what to extract from the results, and how to create and populate discovered objects with the results. The discovery plan is parsed at runtime to create a hierarchy of action objects that perform the individual tasks of discovery. FIG. 3 depicts an exemplary discovery plan in high-level pseudocode, and will be discussed in greater detail below.

Figure 4:
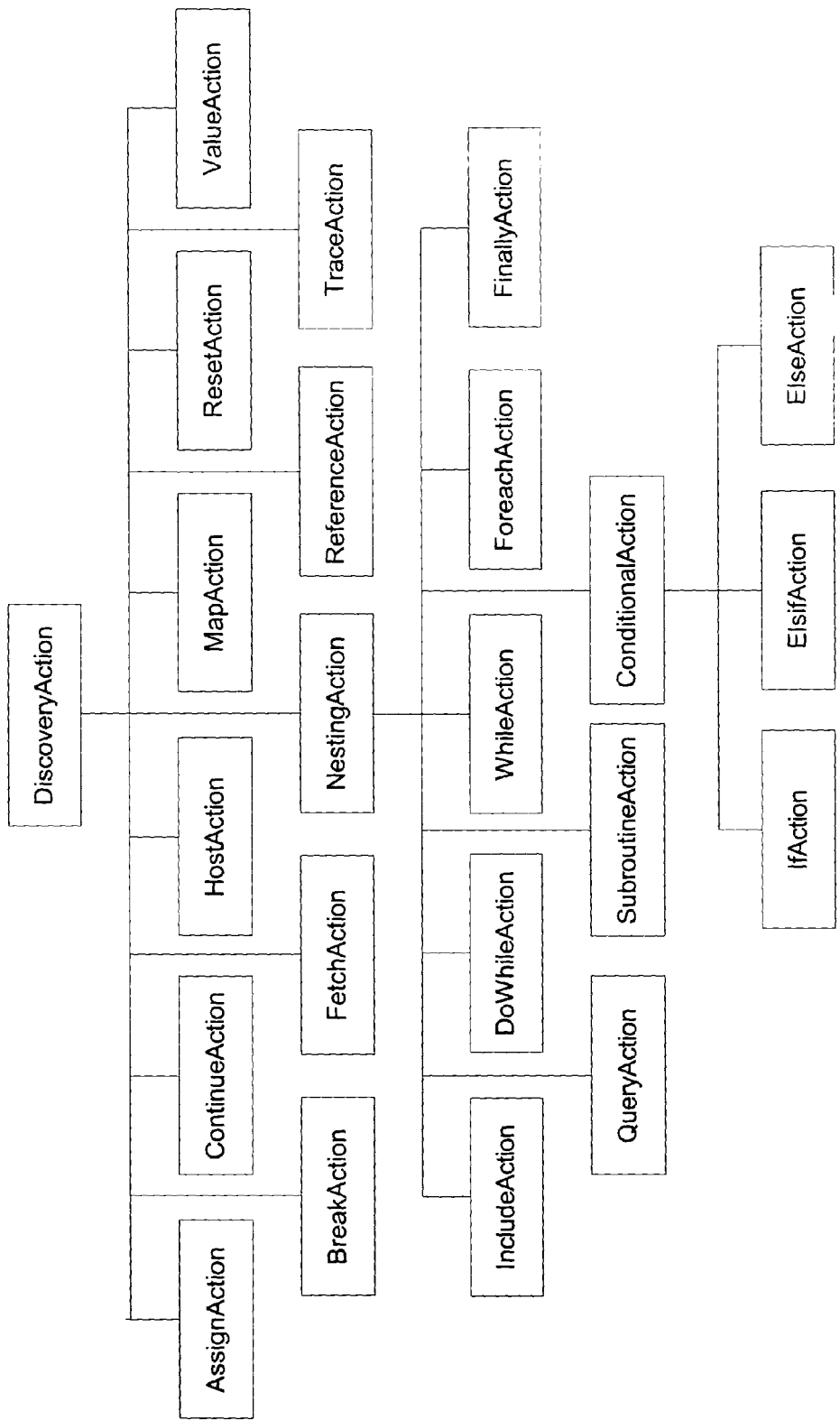
FIG. 4 depicts an exemplary discovery-action hierarchy.

Conceptually, discovery plan 212 is a hierarchy of discovery actions arranged in parent-to-child relationships. A parent can have zero or more children but children may have only one parent. This implies a hierarchy with a single root node. Many specialized action types may be used, and each action knows how to perform its part of the discovery. The DiscoveryAction class declares implementation of an IAction interface but does not implement the perform( ) method. Subclasses must implement the required behavior to perform their particular task. FIG. 4 depicts an exemplary discovery-action hierarchy. Information related to these classes is available by the JavaDocs for that class, as one skilled in the art would appreciate.

The top node of a discovery plan is usually a query action. A query action submits a given query to the device (through the discovery context), and for each row of results optionally creates a discovered object and then asks its child actions to perform. Because a query action is a nesting action, it can have child actions. As previously mentioned, GeNEI 216 facilitates discovery on devices over a given protocol. The details of discovery for a given network element are provided in a discovery plan, such as discovery plan 212.

An exemplary naming convention for discovery plan 212 is <protocol>-<vendor>-<model>-<version>.<extension>. The <protocol> delimiter is replaced with a protocol identifier for the given device, such as an abbreviation string "SNMP," "TL1," etcetera. The <vendor> portion is replaced with the name of the vendor for the device. The <model> and <version> portions are replaced with the name of the device model and the version. An exemplary file format <extension> is .NDP, which can be a simple text file, but many variations could be used. If a discovery plan is intended for all versions of a given model, the version part may be omitted.

Similarly, if the plan is intended for all device models from a given vendor the model part may be omitted. Clearly, the above-mentioned syntax is merely exemplary in nature and is not to be construed as a limitation of the present invention. An ordinary-skilled artisan would appreciate the litany of alternatives to the aforementioned illustrations. When adding a new discovery plan to the system a corresponding entry is made in the resolver file 213 to expose the discovery plan 212 to system 210. A resolver (which is preferably subclassesed from generic resolver 214) uses a configuration file 213 to guide it in performing its functionality. Specific instances of resolver configurations, per files 213, are different for each network in a preferred embodiment. The present invention is not limited to any specific resolver configurations.

Generic Network-Element Interface Development

Figure 2C:
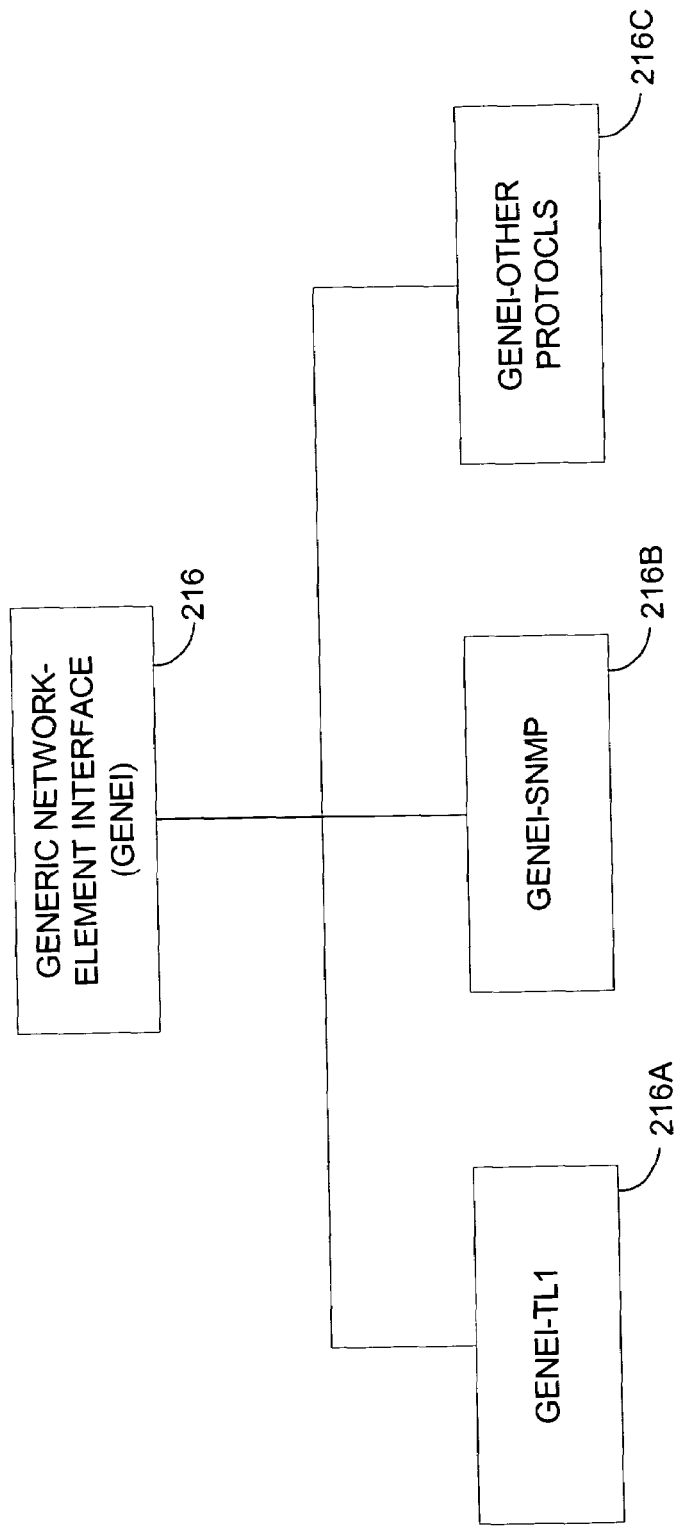

In a preferred embodiment, GeNEI 216 is developed consistent with the TSSDK. Although those skilled in the art would appreciate that a GeNEI 216 may be created in a variety of ways to accomplish the functionality described herein, using the TSSDK is the preferred developmental starting point. An exemplary GeNEI hierarchy diagram is provided in FIG. 2C. The generic interface 216 is subclassed by a protocol-specific interface. Illustrative protocol-specific interfaces include a TL1 interface 216A, or an SNMP interface 216B. Interface 216C is provided to illustrate that many other protocols can be used in connection with the present invention.

In the preferred embodiment, GeNEI 216 relies on a class, which can be derived from the class NemBase. This class defines the interface with the rest of the discovery framework and implements certain functional aspects. The constructor creates an array of NemComponent objects (discussed shortly) and registers them with the framework by calling the setClasses( ) method. All NEM subclasses must implement the functionality of the bind( ) method. This method is called by the framework to establish a session with the network device. The only other major thing a NEM class must do is to implement the methods of the IRegister interface, called installTimeRegister( ) and uninstallTimeUnregister( ). A NEM may also provide an implementation for the testDevice( ) method, which can be used by the discovery framework to support discovery throttling. The various listed properties of the preferred embodiment are consistent with the conventions of the TSSDK for explanatory purposes.

The other major part of the design is the discovery components mentioned earlier. All discovery components derive from the NemComponent class. Most of the discovery code is implemented in the discovery component classes. Each discovery component class implements a method called getAllObjects( ). This method issues a request to the device and processes the results returned. This method will normally use the results to create and populate schema objects and return them as a collection.

The results of discovery are returned to the caller, in this case the discovery system, where such results are used to populate database 220. Database 220 can then be used to update other databases, which may have stale, inaccurate, or missing data.

GeNEI 216 minimizes device-specific code. Whereas the prior-art design limits device-specific code to a NEM, GeNEI 216 eliminates it and pushes the device-specific behavior into an external file, discovery plan 212. GeNEI 216 classes form a hierarchy, the base of which will be referred to as GenericNem and can be subclassed from NemBase to provide much of the functionality. In this embodiment, a subclass of GenericNem is implemented for each protocol. For example, subclasses may be created to facilitate communication using the TL1 protocol and another for the SNMP protocol. Other subclasses may be easily added to enable supporting other protocols.

The constructor of the GeNEI 216 class can be the same as for any typical NEM class. A list of discovery component objects can be created and passed to the setClasses( ) method. But this list contains only a single component (an instance of the GenericDiscovery class, which will be discussed shortly), which performs the entire discovery for GeNEI 216.

The bind( ) method is implemented but defers creation of a session with the device to subclasses. This can be accomplished by defining an abstract method called createSession( ) that is called from the bind( ) method. Each subclass defines this method to create and return a session with the device for their given protocol. An abstract method called getDiscoveryContext( ) provides for a different type of discovery context class for each protocol. Subclasses implement this method to return the proper type of discovery context. The method getDiscoveryPlan( ) can be used by the GeNEI code to resolve, read, and parse a discovery plan. To implement a new GeNEI 216 for a new protocol, a subclass of GenericNem is created and the getDiscoveryContext( ) and createSession( ) methods implemented.

The single discovery component created in the constructor of GeNEI 216 is an instance of the GenericDiscovery class. There is nothing specific to any protocol in this class, so no subclasses are needed. All discovery in the GeNEI 216 can be performed in the getAllObjects( ) method of this class to fetch the proper discovery plan, parse it and convert it into a hierarchically-arranged collection of discovery action objects, request the discovery plan to perform the discovery, and then return the results to discovery server 218.

Figure 5:
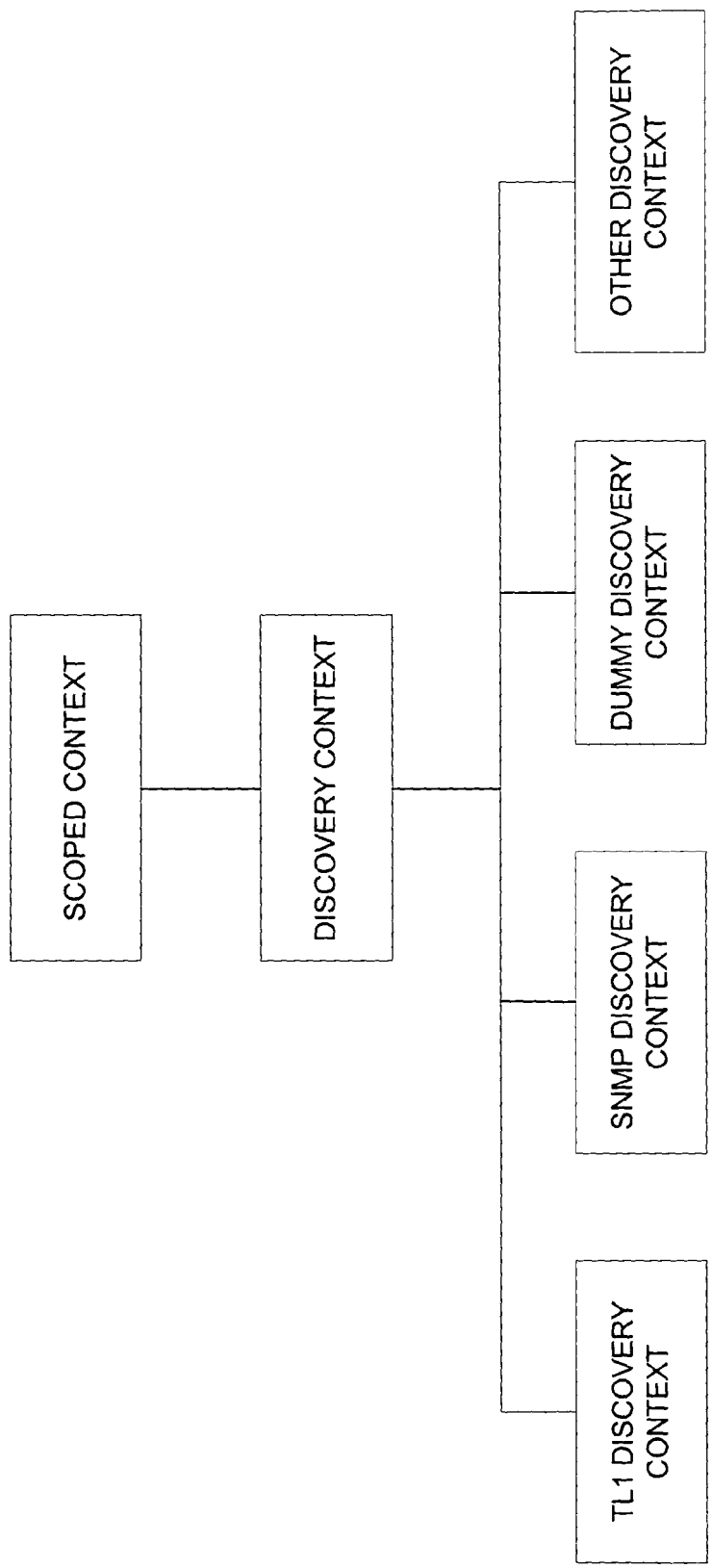
FIG. 5 is a block diagram depicting an exemplary DiscoveryContext hierarchy.

Device-agnostic discovery uses the discovery context classes. Most of the protocol-specific functionality is encapsulated here; so there is a subclass for each protocol in this embodiment. An exemplary DiscoveryContext hierarchy is provided in FIG. 5. Resolver hierarchies and GeNEI hierarchies are similar to the exemplary hierarchy of FIG. 5.

The DiscoveryContext class can declare implementation of the IDeviceQuery interface without actually implementing any of the methods and thus is abstract. Creating a subclass for a new protocol consists primarily of implementing these methods. The discovery context provides much of the discovery functionality. It provides a scoped context where variables may be set or retrieved; discovered objects may be created, stored, and manipulated; and expressions evaluated in the current scope.

The IDeviceQuery interface defines the functionality required to query a network device. In a preferred embodiment, there are only two methods, submitQuery( ) and getNextRow( ). The submitQuery( ) method takes a string containing the query to submit. The contents of this string will be different depending on the protocol. For example, if GeNEI 216 is formatted to use the TL1 protocol, then GeNEI 216 expects this to be a TL1 command. But for SNMP, GeNEI 216 expects this to be a mapping of keys to OIDs. Those skilled in the art will appreciate how other protocols would be implemented.

The getNextRow( ) method is called to retrieve each row of the query results.

It should be called repeatedly after each query has been submitted. Device queries may result in potentially multiple rows of output. The getNextRow( ) method should be called once for each row of output. It returns a Boolean indicating if the retrieval is successful. A "false" will be returned when there are no more rows available.

In a preferred embodiment, a different subclass of GeNEI 216 is used per protocol. Implementing an instance of GeNEI 216 itself is not sufficient to perform discovery. One or more discovery plans must also be provided.

Implementing a GeNEI 216 for a new protocol involves the creation of three new classes in a preferred embodiment. In the following discussions, the string "YYY" will be used to indicate the name of a new protocol. For instance, "GenericYYYNem" is the name of a class that contains the logic of how to establish a connection to the network device using a certain protocol. It implements a method to return a protocol-specific discovery context. The YYYDiscoveryContext class contains the logic to submit a query to and retrieve the results from one or more devices, such as network elements 224, using the desired protocol. The GenericYYYResolver class is specialized to perform resolution for the given protocol.

A subclass of GenericNem is implemented for each protocol supported by the system 210 in a preferred embodiment. Each GenericYYYNem class implements the getDiscoveryContext( ) and createSession( ) methods. The getDiscoveryContext( ) method creates a discovery context for the desired protocol and returns it. A subclass of DiscoveryContext is implemented for each protocol supported by the generic NEM framework. Each YYYDiscoveryContext class implements the submitQuery( ), getNextRow( ), and getprotocol( ) methods.

A subclass of GenericResolver is implemented for each protocol supported by the system 210. Each GenericYYYResolver class implements the getNem( ) method. The implementation can be a single line of code.

Generic Resolver

Generic resolver 214 provides functionality to map discovery plans to network elements 224. The system 210 implements a set of generic resolvers 214, typically one for each protocol, but not necessarily. The present invention uses an abstract class called GenericResolver. This class implements the IAddressResolver and IRegister interfaces required of any resolver. The class declares an abstract method called get- Nem( ). This method is implemented by subclasses to return a protocol-specific instance of GeNEI 216. A connection is made to the device. The resulting discovery context is then passed to the resolveDiscoveryPlan( ) method of the DiscoveryPlanManager class. If a discovery plan is found for the given device, the name of the GeNEI 216 class is returned, indicating to the discovery framework that the given GeNEI 216 is to be used for discovering the given device.

A DiscoveryPlanManager class maps discovery plans to a given network device 224. A command to send to the device is associated with an expected response and a discovery-plan name. The commands are sent to the device 224 one at a time and the response compared to the expected responses. If a match is found, then the name of the corresponding discovery plan is returned. Preferably, all of the mappings are kept in a file.

All of the mappings of expected responses to discovery plan names are preferably kept in a file along with all of the discovery plans. This file is divided primarily into sections for each protocol. Each protocol section contains one or more query elements. Each query has a query to send to the network device. A query element contains one or more mapping elements. Each mapping element has an expression that is evaluated in the context of the given query and a pattern to compare to the results. A mapping also contains the name of a discovery plan to return if the given mapping is matched.

Implementing a GeNEI

Figure 6:
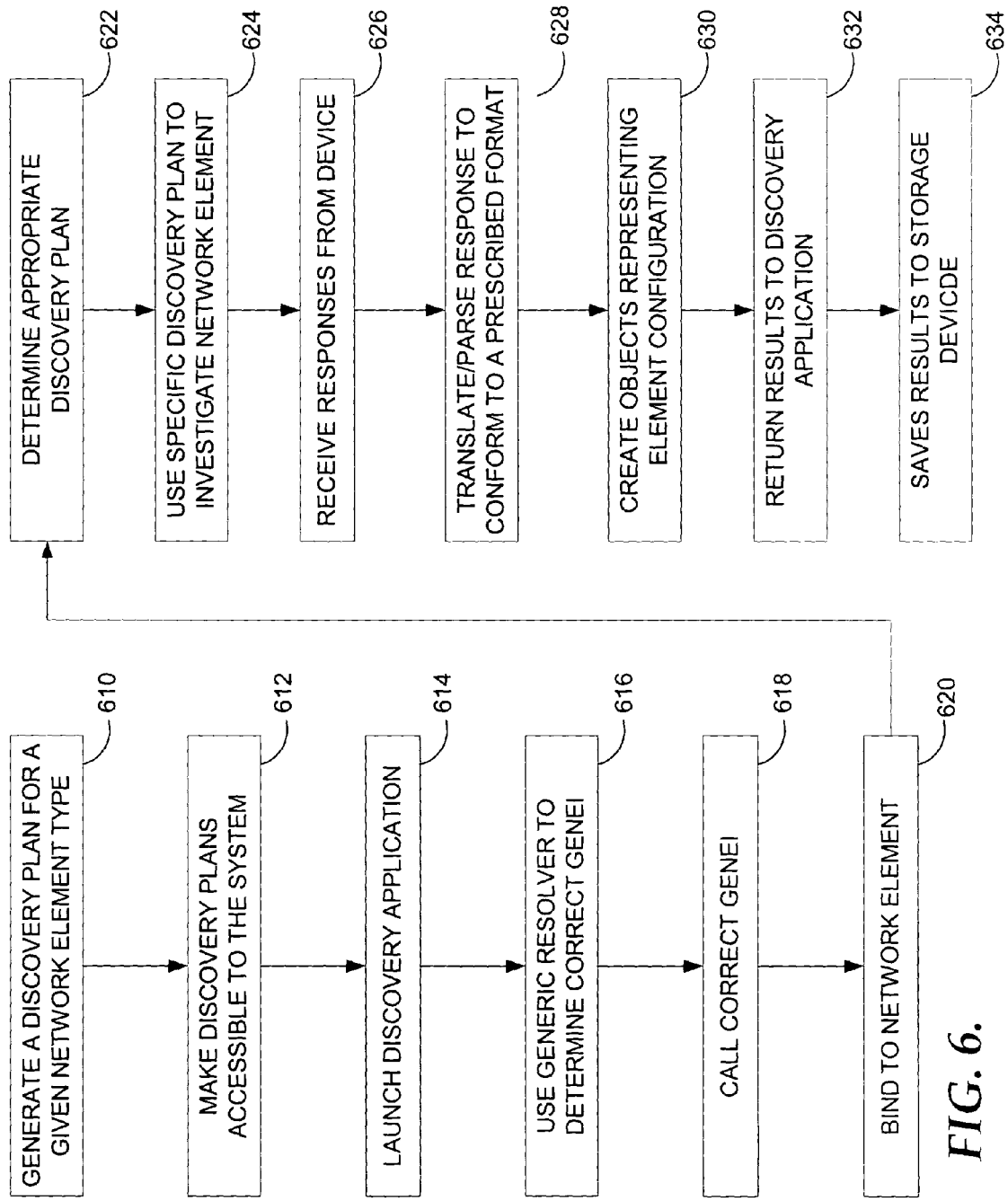
FIG. 6 is a flow diagram depicting functionality offered by an exemplary embodiment of the present invention.

In light of the above disclosure that describes a preferred embodiment of developing a GeNEI 216 in specific terms, a method for identifying network elements—and corresponding attributes—of a communications network is now described in more general terms to illustrate the various functional aspects of the present invention. One skilled in the art would appreciate many ways of carrying out the functionality provided in FIG. 6. Not all steps in FIG. 6 are necessarily required steps. Moreover, some steps are provided for background purposes that clarify how a GeNEI 216 is used to conduct discovery on a communications network.

Turning now to FIG. 6, a discovery plan 227 is generated for a given type of network device at a step 610. In a preferred embodiment, the discovery plan 227 is generated by a network-element specialist, who is familiar with the device 224 for which the plan 227 is being developed. Many discovery plans are created to produce a set of discovery plans 212. In a preferred embodiment, each specific discovery plan 227 is used to query a specific type of network device, but a master discovery plan could be created that includes details of how to communicate with various types of devices (provided those devices are discovered by the same steps). The discovery plan 227 is preferably tested to ensure device compatibility. At a step 612, the discovery plans 212 are installed in the discovery system 210 and made available for retrieval. In a preferred embodiment, this is accomplished by grouping together all of the discovery plans into a common directory within discovery server 218. Discovery server 218 is in communication with GeNEI 216, generic resolver 214, discovery plans 212, and database 220.

At a step 614, the discovery application is launched. The discovery application coordinates GeNEI 216, generic resolver 214, and the discovery plans 212, to identify the appropriate GeNEI 216 to use for the given network element 224. Thus, generic resolver 214 is used to determine the correct GeNEI 216 instance to use at a step 616. GeNEI 216 is protocol specific in a preferred embodiment. If generic resolver 214 determines that a network element 224 communicates using the TL1 protocol, and that a discovery plan exists for that type of network element, then the TL1 instance of GeNEI 216 will be used. Exemplary protocols include Telnet, CORBA, Q3, proprietary network protocols and other element-management-system languages. Many protocols are suitable for use with the present invention, especially protocols that allow queries to be expressed as text strings and allow consistent results to be returned that can be placed in a row/column format. Similarly the present invention is compatible with a variety of services, such as TDM, SONET, ATM, Frame Relay, IP, POTS, xDSL, voicemail, PBX, and virtually any other service or feature. Thus, the correct GeNEI 216 will be called by the discovery application at a step 618 and GeNEI 216 will bind to network element 224 at a step 620. A communications channel now exists between GeNEI 216 and network element 224.

GeNEI 216 will be able to query network element 224 to determine the specific discovery plan 227 to be used to interrogate the specific network device. GeNEI 216 queries network element 224 and retrieves information regarding what type of device is network element 224. Based on that information, GeNEI 216 determines an appropriate discovery plan 227 to use at a step 622. The discovery plan is read and used to create a hierarchy of objects (such as Java objects) that represent the required steps of the plan and their relationships. The objects are object-oriented programming objects that together form an object-based representation of the discovery plan in a preferred embodiment.

This discovery plan 227 is used to investigate the network element 224 at a step 624. A message is sent to the object plan for the objects to begin performing actions, such as query the device, discover network cards, discover terminals, discover common controls, discover shelves, discover cards, discover circuits, discover ports, discover connections, etc. The object plan uses the connection established by the Generic NEM to communicate with the element or device.

By investigating network element 224, technical data related to the network element 224 is retrieved via device responses at a step 626. Exemplary technical data includes device-configuration information, such as software versions, network addresses, and identifiers, which components are installed on the device and their location, and what instances of the available services are provisioned, and other information that is well-known in the art.

Any necessary or desired parsing or translating of the response is completed at a step 628 to conform the received responses to a prescribed format. For instance, bandwidth may be received in bytes/second but is to be stored in bits/second. The responses would be converted accordingly. If certain delimiters, prefixes, or suffixes need to be added to received data, those can be added at this time as well. At a step 630 the information retrieved is used to create a hierarchy of domain objects (such as Java objects) that represent the device's configuration. The objects are object-oriented programming objects that are implemented in a format known to the discovery server in a preferred embodiment. The structure of such object classes aligns with the database schema of the network inventory database 220.

The interrogation results are returned to the discovery application at a step 632, wherein they are communicated to a storage device, such as network-inventory database 220 at a step 634. Network-inventory database 220 can then be used to reconcile other inventory databases.

As can be seen, the present invention and its equivalents are well-adapted to provide a new and useful method for, among other things, discovering network elements. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need to be carried out in the specific order described.

The invention claimed is:

1. In a networking environment, a method for identifying network elements and related information, comprising:
   providing a plurality of discovery plans in a specific format detailing how discovery is to be performed for at least one network element wherein each type or model of at least one network element has a corresponding unique discovery plan detailing how discovery is to be performed on the at least one network element and the appropriate telecommunications protocol necessary to communicate with the at least one network element, each discovery plan having computer-useable device-specific instructions receivable by a network-element-discovery component, such that the computer-usable device-specific instructions are followed in order to perform discovery on at least one network element and specify queries to issue to the at least one network element, information to extract from results of the queries, and how to create and populate discovered objects with the results, wherein discovery includes extracting information from the at least one network element based on the computer-usable device-specific instructions, and wherein computer-useable device-specific instructions include at least one of the following: commands or queries which must be issued to the network element, instructions on how to parse and translate the results received in response to the commands or queries, and instructions on how to create and populate corresponding schema objects in a device-independent manner;
   identifying at least one network element to perform discovery upon;
   selecting a discovery plan from the plurality to interface with the at least one network element; and
   using the selected discovery plan to extract descriptive data from the at least one corresponding network element.

2. The method of claim 1, wherein the network-element-discovery component includes a generic network-element interface (GeNEI) capable of executing the actions specified by a discovery plan; and
   wherein a specialized GeNEI is written for each communication protocol used to communicate with network elements.

3. The method of claim 1, wherein selecting a discovery plan comprises:
   querying the at least one network element; and
   receiving from the at least one network element information sufficient to determine from the plurality of discovery plans the selected discovery plan that will enable the GeNEI to interrogate the at least one network element.

4. The method of claim 3, wherein the at least one network element descriptive data includes data related to the physical characteristics of the at least one network element.

5. The method of claim 4, wherein data related to the physical characteristics of the at least one network element includes information related to one or more of: network cards, terminals, common controls, shelves, communications cards, circuits, ports, connections, virtual tributaries, shelves, communications capabilities, bandwidth characteristics, and identifying information.

6. One or more computer-readable media having computer-useable instructions embodied thereon for performing the method recited in claim 1.

7. A system for automatically populating a database with network-element information related to elements of a communications network, comprising:
   one or more network-element-discovery components;
   a plurality of discovery plans wherein each type or model of at least one network element has a corresponding unique discovery plan detailing how discovery is to be performed on the at least one network element and the appropriate telecommunications protocol necessary to communicate with the at least one network element, each discovery plan having computer-useable device-specific instructions receivable by the network-element-discovery component, such that the computer-usable device-specific instructions are followed in order to perform discovery on at least one network element and specify queries to issue to the at least one network element, information to extract from results of the queries, and how to create and populate discovered objects with the results, wherein discovery includes extracting information from the at least one network element based on the computer-useable device-specific instructions and wherein computer-useable device-specific instructions include at least one of the following: commands or queries which must be issued to the network element, instructions on how to parse and translate the results received in response to the commands or queries, or instructions on how to create and populate corresponding schema object in a device-independent manner;
   an element-querying component to determine which of the plurality of discovery plans is configured to interface with the at least one network element, so that descriptive data can be extracted from the at least one network element.

8. The system of claim 7, further comprising a generic resolver for determining a communications protocol to be used to communicate with the at least one network element, whereby an applicable protocol-specific, device-agnostic interface can be selected to interrogate the at least one network element.

9. The system of claim 7, wherein each of the one or more network-element-discovery components is a protocol-specific, device-agnostic interface that uses one of the plurality of discovery plans to perform discovery functions on a communications network.

10. The system of claim 9, wherein information to be extracted from the one or more network elements includes identifying indicia and technical-specification data, where technical-specification data includes one or more of software versions, network addresses, identifiers, a listing of installed components, a listing of the location of installed components, a listing of the availability of services provisioned.

11. One or more computer-readable media having computer-useable instructions embodied thereon for performing a method of gathering and storing information about devices on a communications network, the method comprising:

identifying a protocol-specific interface module to communicate with a network device;

establishing a logical connection with the network device;

determining from the device a configuration file for interrogating the device wherein each type or model of network device has a corresponding unique configuration file detailing how gathering and storing information about the network device is to be performed on network device and the appropriate telecommunications protocol necessary to communicate with the at least one network element, the configuration file having computer-useable device-specific instructions such that the computer-useable device-specific instructions are followed in order to perform discovery on the device and specify queries to issue to the device, information to extract from results of the queries, and how to create and populate discovered objects with the results, wherein discovery includes extracting information from the device based on the computer-useable device-specific instructions and wherein computer-useable device-specific instructions include at least one of the following: commands or queries which must be issued to the network element, instructions on how to parse and translate the results received in response to the commands or queries, or instructions on how to create and populate corresponding schema objects in a device-independent manner;

interrogating the device to receive device-attribute data related to the device, whereby the device-attribute data can be stored.

12. The media of claim 11, wherein determining a protocol-specific interface module to communicate with a network device includes at least one of the following methods:

issuing a command to the network device and receiving back an indication of a protocol to be used;

issuing a command to the network device and receiving back a response in the protocol to be used; and successively issuing a plurality of commands in various protocols until a response is received from the network device indicating which of the plurality of protocols should be used.

13. The media of claim 12, wherein various protocols include a communications protocol for which a protocol-specific interface can be implemented.

14. The media of claim 13, wherein a communications protocol for which a protocol-specific interface can be implemented include one or more selections from the following: Simple Network Management Protocol, TL1, Telnet, a proprietary command-line-interface, Secure Shell, CORBA, and Q3.

15. The media of claim 13, wherein determining a configuration file includes:

receiving identifying indicia from the device; and identifying a configuration file consistent with the identifying indicia.

16. The media of claim 15, wherein using the configuration file to interrogate the device-attribute data includes information related to one or more of: network cards, terminals, common controls, communications cards, circuits, ports, connections, virtual tributaries, shelves, communications capabilities, bandwidth characteristics, and identifying information.

17. A system for discovering and analyzing network elements of a communications network, the system comprising:

a set of one of more discovery plans in a specific format detailing how discovery is to be performed for at least one network element wherein each type or model of at least one network element has a corresponding unique discovery plan detailing how discovery is to be performed on the at least one network element and the appropriate telecommunications protocol necessary to communicate with the at least one network element, each discovery plan having computer-useable device-specific instructions such that the computer-usable device-specific instructions are followed in order to perform discovery on at least one network element and specify queries to issue to the at least one network element, information to extract from results of the queries, and how to create and populate discovered objects with the results, wherein discovery includes extracting information from the at least one network element based on the computer-useable device-specific instructions, and wherein computer-usable device-specific instructions include at least one of the following: commands or queries which must be issued to the network element, instructions on how to parse and translate the results received in response to the commands or queries, or instructions on how to create and populate corresponding schema objects in a device-independent manner;

a generic resolver that identifies a specific discovery plan from the set of one or more discovery plans that should be used to query the at least one network element; and a generic network-element-interface that receives the identified discovery plan to retrieve device-data from the at least one network element.

18. A method of identifying capabilities of a network, comprising:

providing a set of discovery plans in a specific format detailing how discovery is to be performed for a network element wherein each type or model of network element has a corresponding network-element-interface detailing how discovery is to be performed for said network element and the appropriate telecommunications protocol necessary to communicate with the at least one network element, each having computer-useable device-specific instructions such that the computer-usable device-specific instructions are followed in order to perform discovery on at least one network element and specify queries to issue to the at least one network element, information to extract from results of the queries, and how to create and populate discovered objects with the results, wherein discovery includes extracting information from the at least one network element based on the computer-useable device-specific instructions, and wherein computer-usable device-specific instructions include at least one of the following: commands or queries which must be issued to the network element, instructions on how to parse and translate the results received in response to the commands or queries, or instructions on how to create and populate corresponding schema objects in a device independent manner, identifying an appropriate network-element-interface to use for performing discovery on the at least one network device;

identifying an appropriate discovery plan for the identified network-element-interface to use for performing discovery on the at least one network device;

retrieving data related to the at least one network device; and automatically populating a database with the retrieved data.

* * * * *